July 4, 1961

A. VANWERSCH ET AL 2,991,098

CONNECTING STRUCTURE FOR BEAMS OF
A ROOF SUPPORT OR THE LIKE

Original Filed May 23, 1955

INVENTORS
Aloys Vanwersch
Peter Vanwersch
Ludwig Vanwersch
BY
Michael S. Striker
Attorney

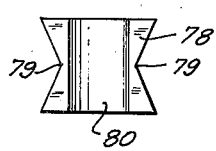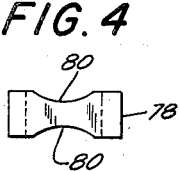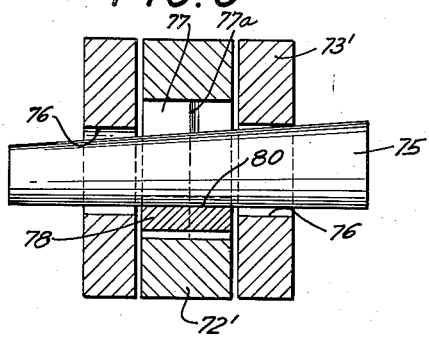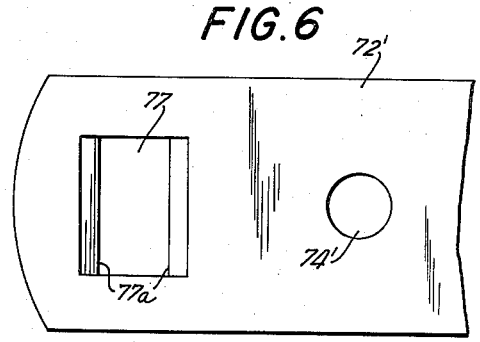

United States Patent Office 2,991,098
Patented July 4, 1961

2,991,098
CONNECTING STRUCTURE FOR BEAMS OF A ROOF SUPPORT OR THE LIKE

Aloys Vanwersch, Angermund, Bezirk Dusseldorf, Peter Vanwersch, Aachen, and Ludwig Vanwersch, Eschweiler, near Aachen, Germany, assignors to Firma Eisenwerk Wanheim G.m.b.H., Duisburg-Wanheim, Germany
Original application May 23, 1955, Ser. No. 510,204. Divided and this application Dec. 24, 1958, Ser. No. 782,851
In France July 8, 1948
Public Law 619, Aug. 23, 1954
Patent expires July 8, 1968
2 Claims. (Cl. 287—99)

This application is a divisional application of our copending application Serial No. 510,204, filed May 23, 1955.

The present invention relates to supporting structures particularly of the type used to support the roof of a mine shaft or the like.

Particular problems are involved in supports of the above type because, on the one hand, they must be robust enough to withstand great forces and because, on the other hand, they must be flexible enough to conform to whatever shape the roof of the mine shaft or the like happens to take.

One of the objects of the present invention is to solve the above problems by providing connections between a plurality of beams which lend to the connected beams sufficient flexibility to conform to a given roof shape and which also lock the beams together in such a way that they provide an extremely strong support.

Another object of the present invention is to provide a beam connecting structure of the above type which is exceedingly simple and which prevents angular displacement of a pair of beams with respect to each other in either direction.

Furthermore, it is an object of the present invention to provide a beam arrangement of the above type which may be disassembled whenever desired to have the beams reversed, for example.

Also, it is an object of the present invention to provide a beam adjusting structure which in addition to adjusting the angle between a pair of successive beams serves also to lock the beams in their adjusted position.

With the above objects in view, the present invention mainly consists of a supporting structure which includes a first beam having a bifurcated end portion provided with a pair of spaced walls each of which is formed with openings, the openings of one wall being aligned with those of the other wall. A second beam has an end portion extending between the spaced walls of the first beam and formed with openings aligned with those of the spaced walls. A pivot pin extends through one set of aligned openings so that the first and second beams are turnable with respect to each other to a desired angular position, and one or more elongated wedge members extend through the other set of aligned openings for locking the beams in a given angular position as well as for turning the beams to the desired angular position.

According to an additional feature of the invention, abutment means are mounted on one of the beams movable between two positions in which they project into one of the passages defined by the aligned openings from one side or the other side respectively for abutting engagement with a wedge member inserted in the passage, so that one of the beams is capable of turning in one or the other direction relative to the other beam depending on the position of the abutment means.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing, in which:

FIG. 3 is a top plan view of an element of the construction shown in FIG. 1;

FIG. 4 is a side elevation thereof;

FIG. 5 is a cross sectional view taken along line 5—5 of FIG. 2; and

FIG. 6 is a partial side view of the second beam of the supporting structure.

Figure 1:
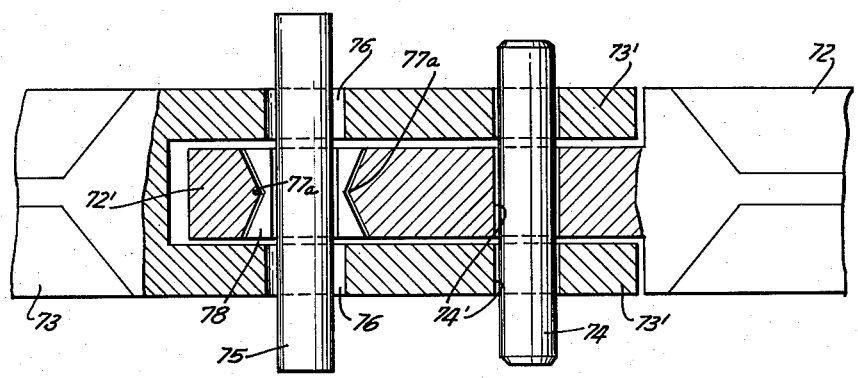
FIG. 1 is a partly sectional fragmentary top plan view illustrating an embodiment of the present invention, the section being taken along line 1—1 of FIG. 2.

Referring now to the drawing, it will be seen that the beam 73 has a bifurcated end portion provided with a pair of spaced walls 73′ between which the end portion 72′ of the beam 72 freely extends. The beams 72 and 73 are supported in a known way by suitable props not shown in the drawing and serving to hold the beams against the roof of a mine shaft or the like.

Figure 2:
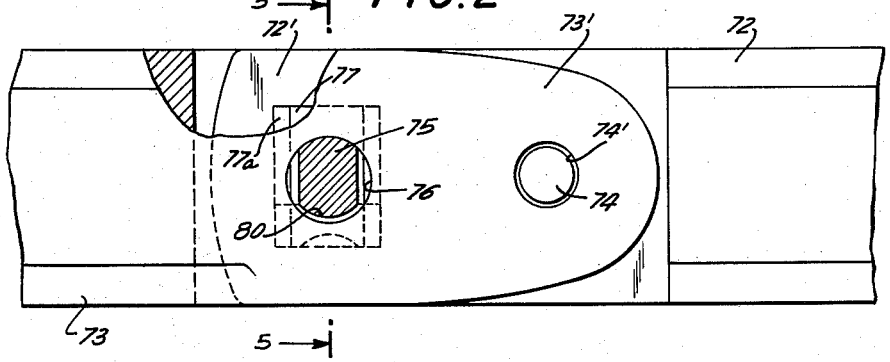
FIG. 2 is a fragmentary side elevational view of the structure shown in FIG. 1.

The walls of the end portions of beams 72 and 73 are respectively formed with openings 74′ which are aligned and through which a pivot pin 74 extends so that in this way the beams 72 and 73 are pivotally connected for angular movement with respect to each other. Through such angular movement of the beam it is possible to arrange them so that they correspond to the contour of a particular roof to be supported. The spaced walls 73′ of the bifurcated end portions of beam 73 are further formed with a pair of aligned openings 76 through which a wedge member 75 extends. The beam 72 is formed with an elongated opening 77 overlapping and extending beyond the openings 76 and provided with elongated projections 77a of substantially V-shaped cross section, for example. A block or abutment means 78 is located in opening 77 and is provided at the side faces thereof with grooves 79 which receive the projections 77a and on the top and bottom faces thereof with preferably curved abutment faces 80. Block 78 may be made of two interconnected parts. Thus, the block 78 is slidable along the opening 77, and it will be seen that the wedge member 75 engages the block 78 at the upper abutment face 80 as well as the beam 73 to lock the beams in a desired angular position with respect to each other, which will depend to the extent the wedge member 75 is driven through openings 76. With this arrangement, if the beam 72 is inverted the block 78 will simply fall to the bottom end of opening 77 and the beam 72 can then be re-assembled with beam 73 and the parts will again have the arrangement shown in FIG. 2.

It will be understood that each of the elements described above, or two or more together, may also find a useful application in other types of supporting structures differing from the types described above.

While the invention has been illustrated and described as embodied in pivotally interconnected beams of a supporting structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential charac-

What is claimed as new and desired to be secured by Letters Patent is:

1. In a supporting structure, in combination, a first beam having a bifurcated end portion provided with a pair of spaced walls each of which is formed with a pair of openings, the openings of one of said walls being aligned with those of the other of said walls so as to define a first and a second passage; a second beam having an end portion extending between said walls of said bifurcated end portion of said first beam and formed with an opening aligned with one of said pairs of aligned openings defining said first passage to provide a set of three aligned openings; a pivot pin extending through said set of three aligned openings and connecting said beams for pivotal movement with respect to each other from an intermediate position in which said beams are aligned in longitudinal direction to positions angularly displaced from said intermediate position and said second beam being constructed to clear said second passage at least during angular displacement of said beams through a preselected angle to either side of said intermediate position; abutment means operatively connected to said second beam movable between a first position partly projecting into said second passage from one side at least when said beams are in said intermediate position, and a second position partly projecting into said second passage from another side opposite said one side at least when said beams are in said intermediate position; and a wedge member extending through said second passage and engaging said abutment means.

2. In a supporting structure, in combination, a first beam having a bifurcated end portion provided with a pair of spaced walls each of which is formed with a pair of openings distributed longitudinally along said beam with the openings of one wall aligned with those of the other wall; a second beam having an end portion extending between said spaced walls and formed with a pair of openings respectively aligned with those of said walls, one of said openings of said second beam being longer than the pair of openings with which it is aligned; a block slidable in said one opening of said second beam; a wedge member extending through said latter opening and the openings aligned therewith and engaging said block; and a pivot pin extending through the remaining openings of said beams.

References Cited in the file of this patent

FOREIGN PATENTS

| | | |
|---|---|---|
| 503,400 | Belgium | June 13, 1951 |
| 722,202 | Great Britain | Jan. 19, 1955 |
| 726,000 | Great Britain | Mar. 16, 1955 |
| 1,009,905 | France | June 5, 1952 |